(12) United States Patent
Nagao et al.

(10) Patent No.: US 9,623,401 B2
(45) Date of Patent: Apr. 18, 2017

(54) EXHAUST GAS PURIFYING CATALYST AND PRODUCTION METHOD THEREOF

(71) Applicant: TOYOTA JIDOSHA KABUSHIKI KAISHA, Toyota-shi, Aichi-ken (JP)

(72) Inventors: Satoshi Nagao, Gotenba (JP); Kazutoshi Akashi, Fuji (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/962,697

(22) Filed: Dec. 8, 2015

(65) Prior Publication Data

US 2016/0184804 A1 Jun. 30, 2016

(30) Foreign Application Priority Data

Dec. 26, 2014 (JP) ................. 2014-266756

(51) Int. Cl.
| | |
|---|---|
| *B01D 53/56* | (2006.01) |
| *B01D 53/94* | (2006.01) |
| *B01J 8/02* | (2006.01) |
| *B01J 21/00* | (2006.01) |
| *B01J 21/04* | (2006.01) |
| *B01J 23/00* | (2006.01) |
| *B01J 23/02* | (2006.01) |
| *B01J 23/10* | (2006.01) |

(Continued)

(52) U.S. Cl.
CPC ...... *B01J 23/6486* (2013.01); *B01D 53/9413* (2013.01); *B01D 53/9418* (2013.01); *B01J 35/0013* (2013.01); *B01J 35/026* (2013.01); *B01J 37/349* (2013.01); *B01D 2255/1025* (2013.01); *B01D 2255/207* (2013.01); *B01D 2255/2065* (2013.01); *B01D 2255/2092* (2013.01); *B01D 2255/20707* (2013.01); *B01D 2255/20715* (2013.01); *B01D 2255/30* (2013.01); *B01D 2255/9202* (2013.01); *B01D 2258/012* (2013.01)

(58) Field of Classification Search
CPC . B01J 21/04; B01J 21/06; B01J 21/063; B01J 21/066; B01J 21/08; B01J 21/12; B01J 23/10; B01J 23/16; B01J 23/464; B01J 23/56; B01J 23/63; B01J 23/6486; B01J 35/026; B01J 37/349; B01D 53/945; B01D 53/9413; B01D 53/9418
USPC ............... 502/242, 246, 261, 263, 304, 326, 502/349–351, 353, 355, 439; 423/213.2, 423/213.5; 977/773, 775
See application file for complete search history.

(56) References Cited

U.S. PATENT DOCUMENTS

| | | | |
|---|---|---|---|
| 6,180,030 B1 * | 1/2001 | Hirai | H01B 1/22 252/512 |
| 7,479,469 B2 * | 1/2009 | Ishihara | B01J 23/40 429/483 |

(Continued)

FOREIGN PATENT DOCUMENTS

| | | |
|---|---|---|
| JP | H03-056140 A | 3/1991 |
| JP | 2002-172324 A | 6/2002 |

*Primary Examiner* — Cam N. Nguyen
(74) *Attorney, Agent, or Firm* — Oliff PLC

(57) ABSTRACT

An exhaust gas purifying catalyst has enhanced NOx purification performance in a lean atmosphere, and a production method for producing an exhaust gas purifying catalyst includes sputtering a target material containing Ta and Rh to form composite fine metal particles respectively containing Ta and Rh.

10 Claims, 2 Drawing Sheets

(51) Int. Cl.
*B01J 23/40* (2006.01)
*B01J 23/42* (2006.01)
*B01J 23/648* (2006.01)
*B01J 37/34* (2006.01)
*B01J 35/00* (2006.01)
*B01J 35/02* (2006.01)

(56) References Cited

U.S. PATENT DOCUMENTS

| | | | |
|---|---|---|---|
| 2002/0039966 A1 | 4/2002 | Tanaka et al. | |
| 2003/0187283 A1* | 10/2003 | Jansen | B01J 23/56 549/523 |
| 2004/0016914 A1* | 1/2004 | Matsuda | C09D 1/00 252/500 |
| 2008/0233465 A1* | 9/2008 | Mizutani | B01J 23/6486 429/431 |

* cited by examiner

EXHAUST GAS PURIFYING CATALYST AND PRODUCTION METHOD THEREOF

TECHNICAL FIELD

The present invention relates to an exhaust gas purifying catalyst and a production method thereof. More specifically, the present invention relates to an exhaust gas purifying catalyst having enhanced NOx purification performance in a lean atmosphere, and a production method thereof.

BACKGROUND ART

Exhaust gas which is discharged from an internal combustion engine, for example, a gasoline engine or a diesel engine for an automobile and the like, contains harmful components such as carbon monoxide (CO), hydrocarbon (HC) and nitrogen oxide (NOx).

Therefore, an exhaust gas purifying apparatus for decomposing and removing such harmful components is provided in the internal combustion engine, and most of the harmful components are substantially rendered harmless by an exhaust gas purifying catalyst installed in the exhaust gas purifying apparatus.

As such an exhaust gas purifying catalyst, for example, a NOx storage reduction catalyst is known, which is a catalyst in which NOx in exhaust gas is stored in a lean atmosphere and is reduced in a stoichiometric or rich atmosphere to nitrogen ($N_2$), and utilizes a change of exhaust gas components among lean, stoichiometric and rich atmospheres.

However, NOx purification in a lean atmosphere is still a problem to be solved, and various studies have been made.

Prior Art Document 1 discloses a ceramic catalyzer where catalyst particles are loaded on ceramic supports and a layer containing Ta as an evapotranspiration-resistant metal is provided on at least part of the outer surface of the catalyst particle so as to prevent evapotranspiration of the catalyst particle.

PRIOR ART DOCUMENTS

[Prior Art Document 1] Japanese Unexamined Patent Publication No. 2002-172324

SUMMARY OF THE INVENTION

Problems to be Solved by the Invention

An exhaust gas purifying catalyst utilizable for NOx purification in a lean atmosphere, and a production method thereof are provided.

Furthermore, in the ceramic catalyzer of Patent Document 1 addressing evapotranspiration of a catalyst, a layer is formed by using Ta as an evapotranspiration-resistant metal, but the above-described problems have not been sufficiently overcome.

The present inventors have found that the above-described problems can be solved by the following means.

<1> A method for producing an exhaust gas purifying catalyst, including sputtering a target material containing Ta and Rh to form composite fine metal particles respectively containing Ta and Rh.

<2> The method according to item <1>, further including loading the composite fine metal particles on powder supports.

<3> The method according to item <1> or <2>, wherein the target material is a micromixed target material obtained by mixing powdered Ta and Rh, and molding and sintering the mixture.

<4> An exhaust gas purifying catalyst having a plurality of composite fine metal particles respectively containing Ta and Rh, wherein the average particle diameter of the composite fine metal particles is 100 nm or less.

<5> The exhaust gas purifying catalyst according to item <4>, further having powdered supports, wherein the composite fine metal particles are loaded on the powdered support.

<6> The exhaust gas purifying catalyst according to item <5>, wherein the powdered support is a powdered support selected from the group consisting of $SiO_2$, $ZrO_2$, $CeO_2$, $Al_2O_3$, $TiO_2$ and a combination thereof.

<7> The exhaust gas purifying catalyst according to any one of items <4> to <6>, wherein the each content percentage of Ta in 70% or more on a number basis of the composite fine metal particles is from 20 to 200% of the average content percentage of Ta in a plurality of the composite fine metal particles.

<8> The exhaust gas purifying catalyst according to any one of items <4> to <7>, wherein the each particle diameter of 70% or more on a number basis of the composite fine metal particles is from 60 to 140% of the average particle diameter of a plurality of the composite fine metal particles.

<9> The exhaust gas purifying catalyst according to any one of items <4> to <8>, which is a catalyst for purifying NOx.

<10> An exhaust gas purifying method including bringing an NOx-containing exhaust gas into contact with the exhaust gas purifying catalyst according to item <9> in a lean atmosphere, thereby reducing and purifying NOx.

Effects of the Invention

According to the present invention, an exhaust gas purifying catalyst having enhanced NOx purification performance in a lean atmosphere, and a production method thereof can be provided.

DETAILED DESCRIPTION OF THE INVENTION

Figure 1:
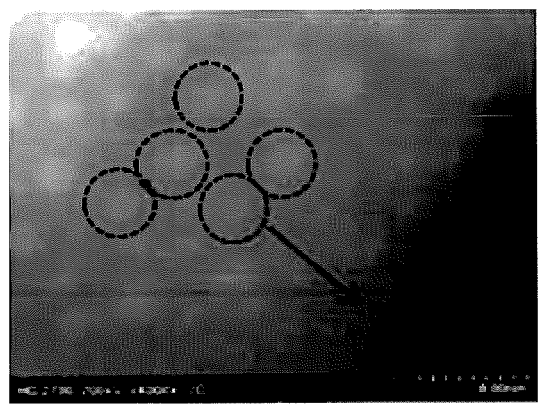
FIG. 1 is an STEM image of the exhaust gas purifying catalyst of Example 1 analyzed by a scanning transmission electron microscope with energy-dispersive X-ray analyzer (STEM-EDX).

The embodiments of the present invention are described in detail below. The present invention is not limited to the following embodiments but may be implemented by making various modifications within the scope of the subject matter of the present invention.

<<Method for Producing Exhaust Gas Purifying Catalyst>>

The method of the present invention for producing an exhaust gas purifying catalyst includes sputtering a target material containing Ta and Rh to form composite fine metal particles respectively containing Ta and Rh.

In general, a nanosize fine metal particle has an electronic energy structure different from a bulk of the metal due to the quantum size effect and exhibits electrical/optical properties depending on the particle size. Furthermore, a nanosize fine metal particle having a very large specific surface area is expected to function as a highly active catalyst.

As the method for producing such nanosize fine metal particles, for example, a co-impregnation method of loading composite fine metal particles on powdered supports by using mixed solution containing a salt of each metal is known.

However, in such a conventional co-impregnation method, it is impossible for a specific combination of Ta and Rh to form each composite fine metal particle in which these respective metal elements are present together at the nano level.

While not being bound by theory, it is considered that because a Ta precursor is likely to be rapidly hydrolyzed in an aqueous solution; a Ta precursor can be hardly caused to be present stably even under strong acidic conditions; and/or Ta and Rh separately precipitate as Ta fine particles and Rh fine particles, respectively, and thus an interaction is not exerted.

In addition, as one of the methods for producing composite fine metal particles each containing a plurality of metal elements, a method is known in which a reducing agent such as alcohol is added to a mixed solution containing a salt of each metal element constituting the fine metal particle and while performing heating, etc., if desired, and thereby ions of respective metal elements contained in the mixed solution are simultaneously reduced.

However, the method above for producing composite fine metal particles by using a reducing agent includes reducing a salt or ion of each metal element dissolved in a solution, and therefore when the salt or ion of each meal element differs in the reduction susceptibility, it is very difficult to form each fine metal particle in which respective metal elements are present together at the nano-level.

More specifically, for example, when a reducing agent such as alcohol is added to a mixed solution containing Ta ion and Rh ion, it is considered that the Ta ion and Rh ion are not simultaneously reduced by the reducing agent but Rh ion susceptible to reduction compared with Ta ion is preferentially reduced and undergoes grain growth.

As a result, Ta fine particles and Rh fine particles are considered to be separately produced without producing each composite fine metal particle in which Ta and Rh are present together at the nano-level.

For the same reason as the reason described in the co-impregnation method, etc., above, it is believed that also in the case of applying other methods, for example, a co-precipitation method or a citric acid method, each composite fine metal particle in which Ta and Rh are present together at the nano-level is difficult to obtain.

Accordingly, even when a conventional wet method, for example, a co-impregnation method or a method using a reducing agent, is employed, it is difficult to produce each composite fine metal particle having formed therein a composite of Ta and Rh. As a result it is believed that it is impossible to produce an exhaust gas purifying catalyst in which NOx purification performance in a lean atmosphere is enhanced.

In contrast, the composite fine metal particles in the method of the present invention are produced by applying a so-called dry method of sputtering a target material containing Ta and Rh. Therefore, by applying the method of the present invention, composite fine metal particles respectively containing Ta and Rh can be produced while avoiding problems arising with the wet method above.

Furthermore, the method of the present invention optionally further includes, after sputtering, depositing the composite fine metal particles on powdered supports. In the case where the composite fine metal particles are loaded on the powdered supports, because of a large specific surface area of the powdered support, the contact surface between an exhaust gas and the composite fine metal particles can be made large, so that the performance of the exhaust gas purifying catalyst can be enhanced.

<Target Material>

According to the method of the present invention, the target material contains Ta and Rh.

As the target material containing Ta and Rh, an optional and appropriate material can be used, although there are no particular limitations thereon, for example, a target material in which Ta and Rh are alternately arranged, or a micromixed target material obtained by mixing powdered Ta and Rh and subjecting the mixture to molding, sintering, etc., may be used.

As the target material in which Ta and Rh are alternately arranged, for example, a disc-shaped material in which Ta and Rh are alternately arranged in a radial manner may be used. According to this disc-shaped target material, each composite fine metal particle having a desired composition ratio of Ta and Rh can be relatively easily synthesized by appropriately changing the areas or area ratio of Ta and Rh.

However, sputterability of a metal by sputtering varies depending on each metal element. Accordingly, the composition ratio of Ta and Rh may be determined by taking into account the sputterability thereof.

Furthermore, the composition ratio at the time of mixing of powdered Ta and Rh may be correlated with the composition ratio of Ta and Rh in each composite fine metal particle produced by sputtering. Therefore, for example, when the objective average content percentage of Ta and Rh in each composite fine metal particle is desired to be X atomic % (X is a positive number) and (100–X) atomic %, respectively, the composition ratio of Ta and Rh in the target material is preferably X:(100–X).

<Sputtering>

According to the method of the present invention, a target material containing Ta and Rh is sputtered so as to form composite fine metal particles respectively containing Ta and Rh.

Such sputtering can be performed by using the optional and appropriate conditions, for example, the gas component, the gas pressure, and the current, voltage, time and number of times of sputtering.

The gas component used for sputtering includes, for example, an inert gas such as helium (He), neon (Ne), argon (Ar), krypton (Kr), xenon (Xe) and nitrogen ($N_2$). Among these, in view of ease of handling, Ar or $N_2$ is preferred.

The gas pressure used for sputtering may be freely selected as long as it is a gas pressure capable of producing plasma, but the gas pressure is preferably 20 Pa or less in general.

The current and voltage used for sputtering may be appropriately set according to the composition of target material, the sputtering apparatus, etc.

The sputtering time may be appropriately set by taking into account the desired deposition amount of the composite fine metal particle, other parameters, etc., and is not particularly limited but, for example, may be appropriately set between tens of minutes to several hours or tens of hours.

As for the number of times, the sputtering may be performed in a plurality of installments every few hours so as to prevent composite fine metal particles which was produced from the target material, from reaching such a high temperature as causing sintering, etc., due to long lasting sputtering. Sintering refers to a phenomenon in which fine metal particles undergo grain growth at a temperature not higher than the melting point thereof.

<Powdered Support>

The method of the present invention further includes loading the composite fine metal particles on powdered supports.

According to the method of the present invention, the powdered support on which the composite fine metal particles are loaded is not particularly limited, but an optional metal oxide generally used as a powdered support in the technical field of exhaust gas purifying catalysts may be used.

Such a powdered support includes, for example, silica ($SiO_2$), zirconia ($ZrO_2$), ceria ($CeO_2$), alumina ($Al_2O_3$), titania ($TiO_2$), and a combination thereof.

The loading amount of the composite fine metal particle loaded on the powdered supports is not particularly limited but may be generally, for example, a loading amount of 0.01 parts by mass or more, 0.05 parts by mass or more, 0.1 parts by mass or more, 0.5 parts by mass or more, or 1 parts by mass or more, and a loading amount of 5 parts by mass or less, 3 parts by mass or less, or 1 part by mass or less, per 100 parts by mass of the powdered supports.

<<Exhaust Gas Purifying Catalyst>>

The exhaust gas purifying catalyst of the present invention has a plurality of composite fine metal particles respectively containing Ta and Rh, wherein the average particle diameter of the composite fine metal particles is 100 nm or less.

While not being bound by theory, the reason why the exhaust gas purifying catalyst of the present invention can enhance the NOx purification performance in a lean atmosphere is considered that Ta excellent in the NOx adsorption ability and Rh excellent in the NOx reduction ability are put in proximity at the nano-level by forming a composite and NOx adsorbed to Ta is thereby rapidly reduced to $N_2$ at Rh.

In this connections, as long as Ta and Rh are in proximity at the nano-level in the composite fine metal particle, the enhanced NOx purification performance can be exerted and, for example, even when the composite fine metal particle is partially converted into its oxide, the exhaust gas purifying catalyst of the present invention can exert the enhanced NOx purification performance.

<Composite Fine Metal Particle>

The composite fine metal particle contains Ta and Rh.

If the particle diameter of the composite fine metal particle is too large, the specific surface area becomes small, and the number of NOx adsorption sites of Ta and the number of NOx active sites of Rh are reduced, as a result, the finally obtained exhaust gas purifying catalyst cannot achieve the sufficient NOx reduction ability in some cases.

In addition, if the particle diameter of the composite fine metal particle is too small, the exhaust gas purifying catalyst may be deactivated.

For these reasons, the average particle diameter of a plurality of composite fine metal particles includes an average particle diameter of more than 0 nm, 1 nm or more, and 2 nm or more. Furthermore, the average particle diameter of a plurality of composite fine metal particles includes an average particle diameter of 100 nm or less, 70 nm or less, 40 nm or less, 10 nm or less, 7 nm or less, 5 nm, 4 nm, and 3 nm or less.

In particular, from the standpoint of efficiently reducing NOx, the average particle diameter of a plurality of composite fine metal particles is preferably an average particle diameter of from 1 to 5 nm, more preferably an average particle diameter of from 1 to 4 nm, still more preferably an average particle diameter of from 2 to 3 nm.

Furthermore, the each particle diameter of 70%, 75%, 80%, 85%, 90% or 95% or more on a number basis of composite fine metal particles may be from 60 to 140%, from 70 to 130%, from 80 to 120%, or from 90 to 110% of the average particle diameter of a plurality of composite fine metal particles.

A composite fine metal particle having such a particle diameter is used as a catalyst component, whereby Ta and Rh can be unfailingly caused to coexist at the nano-level and the NOx adsorption effect of Ta and the NOx reduction ability of Rh can be efficiently exerted. Because of this, an exhaust gas purifying catalyst having enhanced NOx purification performance in a lean atmosphere, can be obtained.

Incidentally, unless otherwise indicated, the "average particle diameter" as used in the present invention indicates an arithmetic mean value of measured values when randomly selected 10 or more particles are measured for the equivalent-circle diameter (Heywood diameter) by means of a scanning transmission electron microscope (STEM), energy-dispersive X-ray analysis (EDX), etc.

When the average content percentage of Ta in each of the composite fine metal particles is from 1 to 30 atomic %, the number of NOx active sites of Rh can be adequately ensured while sufficiently obtaining the NOx adsorption effect of Ta.

For this reason, the average content percentage of Ta in a plurality of composite fine metal particles is preferably more than 0 atomic %, 1 atomic % or more, 3 atomic % or more, 5 atomic % or more, 7 atomic % or more, 10 atomic % or more, 12 atomic % or more, or 15 atomic % or more, and preferably 30 atomic % or less, 20 atomic % or less, 17 atomic % or less, 15 atomic % or less, 13 atomic % or less, or 10 atomic % or less.

In addition, the content percentage of Ta in 70%, 75%, 80%, 85%, 90% or 95% or more on a number basis of the composite fine metal particles may be from 20 to 200%, from 25 to 180%, from 30 to 170%, from 40 to 160%, or from 50 to 150% of the average content percentage of Ta in a plurality of composite fine metal particles.

For this reason, the number of NOx adsorption sites of Ta can be maintained, and the NOx purification ability of Rh can be efficiently exerted, as a result, an exhaust gas purifying catalyst of which NOx reduction ability is remarkably enhanced can be obtained.

The "average content percentage of Ta" as used in the present invention indicates a ratio of the number of Ta atoms to the total number of Ta atoms and Rh atoms contained in a composite fine metal particle. The "average content percentage of Ta" in the present invention can be calculated, for example, by analyzing composite fine metal particles by use of an optical method such as STEM-EDX.

<<Exhaust Gas Purifying Method>>

In the method of the present invention for purifying exhaust gas, under a lean atmosphere, NOx-containing exhaust gas is put into contact with the above-described exhaust gas purifying catalyst of the present invention, thereby reducing and purifying NOx.

The method of the present invention is preferably applied to an internal combustion engine working in a lean atmosphere. Under such a lean atmosphere, while HC and CO are readily oxidized and purified, NOx is less likely to be reduced and purified, leading to generation of a large amount of NOx.

As the method for bringing NOx-containing exhaust gas into contact with the exhaust gas purifying catalyst of the present invention in a lean atmosphere, an optional method can be employed.

The present invention is described in greater detail by referring to Examples below, but the scope of the present invention is of course not limited to these Examples.

EXAMPLES

Example 1

<Preparation of Target Material>

Powdered Ta and Rh were mixed in a composition ratio of 5:95, and the mixture was molded and sintered to prepare a micromixed target material containing Ta and Rh.

<Production of Exhaust Gas Purifying Catalyst>

The target material prepared above and an $Al_2O_3$ powder as a powdered support were placed in a sputtering apparatus filled with an Ar atmosphere, and a voltage was applied to a pair of electrodes mounted on the sputtering apparatus to generate plasma between electrodes, thereby performing sputtering. After the sputtering, the $Al_2O_3$ powder having loaded thereon Ta and Rh was taken out from the sputtering apparatus to obtain an exhaust gas purifying catalyst.

Examples 2 to 4 and Comparative Example 1

Target materials were prepared and exhaust gas purifying catalysts were obtained in the same manner as in Example 1 other than in the preparation of the target material, the composition ratio of powdered Ta and Rh was changed to 3:97 (Example 2), 10:90 (Example 3), 15:85 (Example 4), and 0:100 (Comparative Example 1).

Comparative Example 2

<Synthesis of $Ta_2O_5$ and Production of Exhaust Gas Purifying Catalyst>

In a glove box, 2 g of $TaCl_5$ and 200 ml of anhydrous benzyl alcohol were added to a glass vial. The glass vial containing the mixture was taken out from the glove box, and the mixture was stirred at room temperature over 3 hours. Thereafter, the mixture in the glass vial was transferred to an autoclave vessel and after immersing the autoclave vessel in an oil bath at 220° C., the mixture was stirred over 72 hours.

The autoclave vessel was removed from the oil bath and cooled to room temperature and then, a centrifuging operation on the product and a washing operation on the precipitate with ethanol were performed three times. The precipitate obtained after the washing was dried under reduced pressure at 70° C. to obtain $Ta_2O_5$. When this $Ta_2O_5$ was observed by a transmission electron microscope (TEM), the primary particle diameter of $Ta_2O_5$ was about 7 nm.

The $Ta_2O_5$ powder above and $Rh/Al_2O_3$ of Comparative Example 1 were mixed to give a composition ratio of Ta and Rh of 5:95, whereby an exhaust gas catalyst was produced.

Incidentally, for the synthesis of $Ta_2O_5$, Phys. Chem. Chem. Phys., 2010, 12, 15537 was referred to.

<ICP-MS Analysis>

The exhaust gas purifying catalysts produced in Examples 1 to 4 and Comparative Examples 1 and 2 were analyzed by ICP-MS (inductively coupled plasma mass analyzer). From this analysis, the mass % concentration of Rh based on $Al_2O_3$ in each Example and the composition ratio of Ta and Rh in the exhaust gas purifying catalyst of each Example were evaluated.

As a result, the mass % concentration of Rh based on $Al_2O_3$ in each Example was about 1 mass %, and the composition ratio of Ta and Rh in the exhaust gas purifying catalyst of each Example was substantially the same as the composition ratio of Ta and Rh in the target material used in that Example. The results are shown in Table 1.

<STEM-EDX and XRD Analyses>

STEM-EDX and XRD were applied to the exhaust gas purifying catalysts produced in Examples 1 to 4 and Comparative Examples 1 and 2 and by extracting a plurality of fine particles as measurement points from the STEM image, the composition and particle diameter of a fine particle at each measurement point were evaluated. The results of Example 1 are shown in Table 1 and FIGS. 1 to 3, and the results of other examples are shown in Table 1.

TABLE 1

Relationship of Exhaust Gas Purifying Catalyst and Fine metal Particle

| | Form of Fine metal Particle | Average Composition Ratio of Ta and Rh | Average Particle Diameter (nm) |
|---|---|---|---|
| Example 1 | composite fine particle of Ta and Rh | 5:95 | 2.5 |
| Example 2 | composite fine particle of Ta and Rh | 3:97 | 2.5 |
| Example 3 | composite fine particle of Ta and Rh | 10:90 | 2.5 |
| Example 4 | composite fine particle of Ta and Rh | 15:85 | 2.5 |
| Comparative Example 1 | only Rh | 0:100 | 2.5 |
| Comparative Example 2 | Ta fine particle or Rh fine particle | 5:95 | 2.5 |

Figure 2:
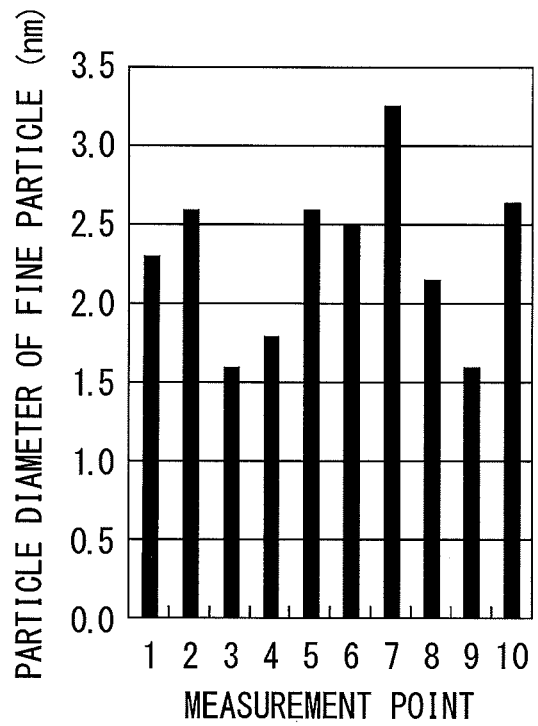
FIG. 2 is a view illustrating the particle diameter (nm) distribution of 10 fine particles of Example 1.

FIG. 1 is an STEM image of the exhaust gas purifying catalyst of Example 1 analyzed by a scanning transmission electron microscope with energy-dispersive X-ray analyzer (STEM-EDX). In addition, FIG. 2 is a view illustrating the particle diameter (nm) distribution of 10 fine particles of Example 1. Furthermore, FIG. 3 is a view illustrating the Rh content (%) distribution of 10 fine particles of Example 1.

Referring to FIGS. 1 and 2, it is seen that fine metal particles having particle diameters of from 1.5 to 3.5 nm are dispersedly present on the surface of the powdered supports $Al_2O_3$. Accordingly, it is understood that the average particle diameter of a plurality of fine metal particles is about 2.5 nm and the each particle diameter of the fine metal particles are from 60 to 140% of the average particle diameter of a plurality of composite fine metal particles.

Figure 3:
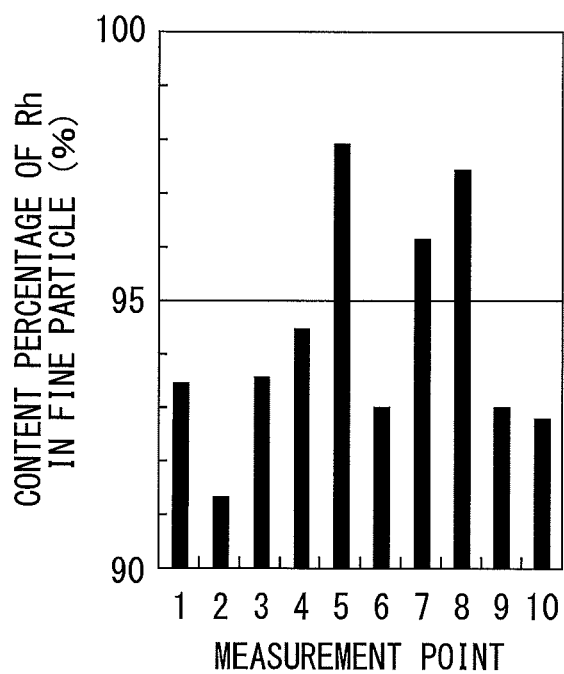
FIG. 3 is a view illustrating the Rh content (%) distribution of 10 fine particles of Example 1.

Referring to FIG. 3, it is seen that the content (%) of Rh in a plurality of fine metal particles is from 91 to 98%, that is, the content percentage of Ta in a plurality of fine metal particles is from 2 to 9%. Accordingly, it is understood that the average content percentage of Ta in a plurality of fine metal particles is 5% from Table 1 and the content percentage of Ta in the each fine metal particle is from 40 to 180% of the average content percentage of Ta in a plurality of composite fine metal particles.

Consequently, it is appreciated from FIGS. 1 to 3 and Table 1 that the fine metal particles of the exhaust gas purifying catalyst of Example 1 are composite fine metal particles respectively containing Ta and Rh, the content percentage of Rh in each of the composite fine metal particles, i.e., the content percentage of Ta, is substantially uniform, and these composite fine metal particles with a substantially uniform particle diameter are dispersedly present on powdered supports.

<Evaluation of Gas Purifying Ability>

A powder of each of the exhaust gas purifying catalysts produced in Examples 1 to 4 and Comparative Examples 1 and 2 was press-molded into a pellet at a press pressure of 2 t/cm², and the resulting pellet-like catalyst was cracked and thereby formed into a granule. The resulting granular catalyst was used as a sample for the evaluation of gas purification ability.

In the evaluation of gas purification ability, a gas flow-type catalyst evaluation apparatus was used. Specifically, the composition of the test gas after being put into contact with a sample was measured by applying infrared spectroscopy. The results are shown in Table 2.

At this time, the mass of the sample was set to 2 g, and the test gas set to consist of CO: 0.65%, $C_3H_6$: 3,000 ppmC (1000 ppm), NO: 1,500 ppm, $O_2$: 0.72%, $H_2O$: 3%, $CO_2$: 10%, and $N_2$: balance.

In addition, the flow velocity of the test gas was set to 10 L/min, and the space velocity (SV) was set to 200,000 $h^{-1}$. The space velocity means a value obtained by dividing the flow rate (volume/h) of the test gas by the volume of the sample.

Furthermore, the test gas above was a so-called lean atmosphere ($\lambda>1$).

The "$\lambda$" indicative of the strength of lean atmosphere is defined by "oxidizing agent equivalent/reducing agent equivalent". For example, the rich, stoichiometric and lean atmospheres can be expressed by $\lambda<1$, $\lambda=1$ and $\lambda>1$, respectively. Specifically, the test gas above can be expressed by $\lambda=1.03$.

TABLE 2

NO Conversion Percentage (%) in Lean Atmosphere

| | NO Conversion Percentage (%) | | |
|---|---|---|---|
| | 300° C. | 400° C. | 500° C. |
| Example 1 | 98 | 97 | 90 |
| Example 2 | 98 | 91 | 88 |
| Example 3 | 97 | 93 | 87 |
| Example 4 | 97 | 93 | 86 |
| Comparative Example 1 | 93 | 90 | 85 |
| Comparative Example 2 | 94 | 91 | 85 |

Referring to Table 2, it is seen that in Examples 1 to 4, the NO conversion percentage (%) achieves 97% or more at 300° C., 91% or more at 400° C., and 86% or more at 500° C.

On the other hand, in Comparative Example 1 where the fine metal particles do not contain Ta, the NO conversion percentage (%) remained at 93% at 300° C., 90% at 400° C., and 85% at 500° C., and it is understood that each of NO conversion percentages (%) are lower than each of the NO conversion percentages (%) of Examples 1 to 4.

This difference in the NO conversion percentage (%) is considered to be ascribable to the fact that the exhaust gas purifying catalysts of Examples 1 to 4 have a plurality of composite fine metal particles respectively containing Ta and Rh.

More specifically, it is considered that in contrast with the exhaust gas purifying catalyst of Comparative Example 1, in the exhaust gas purifying catalysts of Examples 1 to 4, Ta excellent in the NOx adsorption ability and Rh excellent in the NOx reduction ability are put in proximity at the nano-level by forming a composite and NOx adsorbed to Ta is thereby reduced to $N_2$ at Rh.

Furthermore, in the exhaust gas purifying catalysts of Examples 1 and 4, the content percentage of Rh in each of the composite fine metal particles is substantially uniform and composite fine metal particles with a substantially uniform particle diameter are dispersedly present on powdered supports. Accordingly, the NOx reduction ability of the composite fine metal particle containing Ta and Rh is considered to be efficiently exerted.

In addition, in Comparative Example 2 where Ta fine particles and Rh fine particles are separately dispersed, the NO conversion percentage (%) remained at 94% at 300° C., 91% at 400° C., and 85% at 500° C., and it is understood that each of NO conversion percentages (%) are lower than each of the NO conversion percentages (%) of Examples 1 to 4.

It is believed that in the exhaust gas purifying catalyst of Comparative Example 2, Ta and Rh do not form a composite and cannot be put in proximity at the nano-level, and thereby it is difficult for Rh to reduce NOx absorbed to Ta.

In addition, it is understood from Tables 1 and 2 that in the exhaust gas purifying catalysts of Examples 1 to 4, as the average composition ratio of Ta and Rh approaches 5:95 (Example 1), the NO conversion percentage (%) at 300° C., 400° C. and 500° C. is elevated.

What is claimed is:

1. A method for producing an exhaust gas purifying catalyst, comprising sputtering a target material containing Ta and Rh to form composite fine metal particles respectively containing Ta and Rh.

2. The method according to claim 1, further comprising loading the composite fine metal particles on powdered supports.

3. The method according to claim 1. wherein the target material is a micromixed target material obtained by mixing powdered Ta and Rh, and molding and sintering the mixture.

4. An exhaust gas purifying catalyst having a plurality of composite fine metal particles respectively containing Ta and Rh, wherein the average particle diameter of the composite fine metal particles is 100 nm or less.

5. The exhaust gas purifying catalyst according to claim 4, further having powdered supports, wherein the composite fine metal particles are loaded on the powdered supports.

6. The exhaust gas purifying catalyst according to claim 5, wherein the powdered support is a powdered support selected from the group consisting of $SiO_2$, $ZrO_2$, $CeO_2$, $Al_2O_3$, $TiO_2$ or a combination thereof.

7. The exhaust gas purifying catalyst according to claim 4, wherein the each content percentage of Ta in 70% or more on a number basis of the composite fine metal particles is from 20 to 200% of the average content percentage of Ta in a plurality of the composite fine metal particles.

8. The exhaust gas purifying catalyst according to claim 4, wherein the each particle diameter of 70% or more on a number basis of the composite fine metal particles is from 60 to 140% of the average particle diameter of a plurality of the composite fine metal particles.

9. The exhaust gas purifying catalyst according to claim 4, which is a catalyst for purifying NOx.

10. An exhaust gas purifying method comprising bringing an NOx—containing exhaust gas into contact with the exhaust gas purifying catalyst according to claim 9 in a lean atmosphere, thereby reducing and purifying NOx.

* * * * *